United States Patent
Maruyama (10) Patent No.: US 7,035,644 B1
(45) Date of Patent: Apr. 25, 2006

(54) METHOD FOR ALLOCATING RADIO CHANNEL FOR RADIO COMMUNICATION

(75) Inventor: Kazuhiko Maruyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 871 days.

(21) Appl. No.: 09/355,732

(22) PCT Filed: Dec. 16, 1997

(86) PCT No.: PCT/JP97/04644

§ 371 (c)(1),
(2), (4) Date: Aug. 4, 1999

(87) PCT Pub. No.: WO99/31823

PCT Pub. Date: Jun. 24, 1999

(51) Int. Cl.
*H04Q 7/20* (2006.01)
(52) U.S. Cl. .................. 455/452.2; 455/62; 370/329
(58) Field of Classification Search ......... 455/450, 455/451, 452, 453, 62, 509, 510, 512, 513, 455/514, 436, 452.1, 452.2; 370/329, 330, 370/332, 468, 464
See application file for complete search history.

(56) References Cited

U.S. PATENT DOCUMENTS

| 5,239,676 | A | * | 8/1993 | Strawczynski et al. .... 455/33.2 |
| 5,355,374 | A | | 10/1994 | Hester et al. |
| 5,446,739 | A | | 8/1995 | Nakano et al. |
| 5,448,759 | A | * | 9/1995 | Krebs et al. ................ 455/54.1 |
| 5,457,680 | A | * | 10/1995 | Kamm et al. ............... 455/67.1 |
| 5,598,416 | A | | 1/1997 | Yamada et al. |
| 5,625,877 | A | * | 4/1997 | Dunn et al. .................... 455/62 |
| 5,781,583 | A | * | 7/1998 | Bruckert et al. ............ 375/206 |
| 5,787,346 | A | | 7/1998 | Iseyama |
| 5,799,252 | A | * | 8/1998 | Nakagoshi et al. ......... 455/524 |
| 5,940,763 | A | * | 8/1999 | Alperovich et al. ........ 455/450 |

FOREIGN PATENT DOCUMENTS

| EP | 0 347 396 A1 | 12/1989 |
| JP | 897824 | 4/1996 |
| JP | 09-163431 | 6/1997 |
| WO | WO 95/07578 A1 | 3/1995 |
| WO | WO 97/23073 A1 | 6/1997 |

* cited by examiner

*Primary Examiner*—Lee Nguyen
(74) *Attorney, Agent, or Firm*—Rothwell, Figg, Ernst & Manbeck, PC (57) ABSTRACT

In carrying out radio communication between one base station and a plurality of radio terminals in its radio zone, the number of channels, the number of slots, the frequency band or similar channel factor is changed in accordance with the amount of communication data or the rate of change of the amount of communication data per unit time, by which it is possible to speed up data communication and reduce inefficient use of channels through effective utilization of a limited number of channels.

20 Claims, 12 Drawing Sheets

| CHANNEL M | UNASSIGNED | | CHANNEL M | USED BY TERMINAL A |
| CHANNEL M+1 | USED BY TERMINAL A | | CHANNEL M+1 | USED BY TERMINAL A |
| CHANNEL M+2 | UNASSIGNED | | CHANNEL M+2 | USED BY TERMINAL A |
| CHANNEL M+3 | UNASSIGNED | | CHANNEL M+3 | UNASSIGNED |

FIG.4(A)    FIG.4(B)

| CHANNEL M | USED BY TERMINAL A | | CHANNEL M | UNASSIGNED |
| CHANNEL M+1 | USED BY TERMINAL A | | CHANNEL M+1 | USED BY TERMINAL A |
| CHANNEL M+2 | USED BY TERMINAL A | | CHANNEL M+2 | UNASSIGNED |
| CHANNEL M+3 | UNASSIGNED | | CHANNEL M+3 | UNASSIGNED |

FIG.5(A)

| CHANNEL M | USED BY TERMINAL A |
|---|---|
| CHANNEL M+1 | USED BY TERMINAL B |
| CHANNEL M+2 | USED BY TERMINAL C |
| CHANNEL M+3 | USED BY TERMINAL D |

......

| CHANNEL N | UNASSIGNED |
|---|---|
| CHANNEL N+1 | UNASSIGNED |
| CHANNEL N+2 | UNASSIGNED |
| CHANNEL N+3 | UNASSIGNED |

FIG.5(B)

| CHANNEL M | USED BY TERMINAL A |
|---|---|
| CHANNEL M+1 | USED BY TERMINAL B |
| CHANNEL M+2 | UNASSIGNED |
| CHANNEL M+3 | USED BY TERMINAL D |

......

| CHANNEL N | USED BY TERMINAL C |
|---|---|
| CHANNEL N+1 | USED BY TERMINAL C |
| CHANNEL N+2 | USED BY TERMINAL C |
| CHANNEL N+3 | UNASSIGNED |

FIG.6(A)

| CHANNEL M | USED BY TERMINAL A |
| --- | --- |
| CHANNEL M+1 | USED BY TERMINAL B |
| CHANNEL M+2 | USED BY TERMINAL C |
| CHANNEL M+3 | USED BY TERMINAL D |

......

| CHANNEL N | UNASSIGNED |
| --- | --- |
| CHANNEL N+1 | UNASSIGNED |
| CHANNEL N+2 | UNASSIGNED |
| CHANNEL N+3 | UNASSIGNED |

FIG.6(B)

| CHANNEL M | USED BY TERMINAL A |
| --- | --- |
| CHANNEL M+1 | USED BY TERMINAL C |
| CHANNEL M+2 | USED BY TERMINAL C |
| CHANNEL M+3 | USED BY TERMINAL C |

......

| CHANNEL N | USED BY TERMINAL B |
| --- | --- |
| CHANNEL N+1 | USED BY TERMINAL D |
| CHANNEL N+2 | UNASSIGNED |
| CHANNEL N+3 | UNASSIGNED |

FIG.7(A)

| CHANNEL M | USED BY TERMINAL A |
|---|---|
| CHANNEL M+1 | USED BY TERMINAL B |
| CHANNEL M+2 | USED BY TERMINAL E |
| CHANNEL M+3 | USED BY TERMINAL D |

......

| CHANNEL N | USED BY TERMINAL C |
|---|---|
| CHANNEL N+1 | USED BY TERMINAL C |
| CHANNEL N+2 | USED BY TERMINAL C |
| CHANNEL N+3 | USED BY TERMINAL F |

FIG.7(B)

| CHANNEL M | USED BY TERMINAL A |
|---|---|
| CHANNEL M+1 | USED BY TERMINAL B |
| CHANNEL M+2 | USED BY TERMINAL E |
| CHANNEL M+3 | USED BY TERMINAL D |

......

| CHANNEL N | USED BY TERMINAL C |
|---|---|
| CHANNEL N+1 | USED BY TERMINAL G |
| CHANNEL N+2 | UNASSIGNED |
| CHANNEL N+3 | USED BY TERMINAL F |

FIG. 8(A)

| CHANNEL M | USED BY TERMINAL A |
| --- | --- |
| CHANNEL M+1 | UNASSIGNED |
| CHANNEL M+2 | USED BY TERMINAL C |
| CHANNEL M+3 | UNASSIGNED |

| CHANNEL N | UNASSIGNED |
| --- | --- |
| CHANNEL N+1 | USED BY TERMINAL B |
| CHANNEL N+2 | UNASSIGNED |
| CHANNEL N+3 | USED BY TERMINAL D |

FIG. 8(B)

| CHANNEL M | USED BY TERMINAL A |
| --- | --- |
| CHANNEL M+1 | USED BY TERMINAL B |
| CHANNEL M+2 | USED BY TERMINAL C |
| CHANNEL M+3 | USED BY TERMINAL D |

| CHANNEL N | UNASSIGNED |
| --- | --- |
| CHANNEL N+1 | UNASSIGNED |
| CHANNEL N+2 | UNASSIGNED |
| CHANNEL N+3 | UNASSIGNED |

| | S1 | S2 | S3 | S1 | S2 | S3 | S1 | S2 | S3 |
|---|---|---|---|---|---|---|---|---|---|
| CHANNEL M | A | UNASSIGNED | UNASSIGNED | A | UNASSIGNED | UNASSIGNED | A | UNASSIGNED | UNASSIGNED |
| CHANNEL M+1 | UNASSIGNED | UNASSIGNED | UNASSIGNED | UNASSIGNED | UNASSIGNED | UNASSIGNED | UNASSIGNED | UNASSIGNED | UNASSIGNED |

FIG.10(B)

| | S1 | S2 | S3 | S1 | S2 | S3 | S1 | S2 | S3 |
|---|---|---|---|---|---|---|---|---|---|
| CHANNEL M | A | A | A | A | A | A | A | UNASSIGNED | UNASSIGNED |
| CHANNEL M+1 | UNASSIGNED | UNASSIGNED | UNASSIGNED | UNASSIGNED | UNASSIGNED | UNASSIGNED | UNASSIGNED | UNASSIGNED | UNASSIGNED |

FIG.11(A)

| | S1 | S2 | S3 | S1 | S2 | S3 | S1 | S2 | S3 |
|---|---|---|---|---|---|---|---|---|---|
| CHANNEL M | A | A | A | A | A | A | A | A | A |
| CHANNEL M+1 | UNASSIGNED | UNASSIGNED | UNASSIGNED | UNASSIGNED | UNASSIGNED | UNASSIGNED | UNASSIGNED | UNASSIGNED | UNASSIGNED |

FIG.11(B)

| | S1 | S2 | S3 | S1 | S2 | S3 | S1 | S2 | S3 |
|---|---|---|---|---|---|---|---|---|---|
| CHANNEL M | A | UNASSIGNED | UNASSIGNED | A | UNASSIGNED | UNASSIGNED | A | UNASSIGNED | UNASSIGNED |
| CHANNEL M+1 | UNASSIGNED | UNASSIGNED | UNASSIGNED | UNASSIGNED | UNASSIGNED | UNASSIGNED | UNASSIGNED | UNASSIGNED | UNASSIGNED |

FIG.12(A)

| | S1 | S2 | S3 |
|---|---|---|---|
| CHANNEL M | A | B | C |
| CHANNEL M+1 | UNASSIGNED | UNASSIGNED | UNASSIGNED |

| | S1 | S2 | S3 |
|---|---|---|---|
| CHANNEL M | A | B | UNASSIGNED |
| CHANNEL M+1 | C | C | C |

FIG.13(A)

| | S1 | S2 | S3 |
|---|---|---|---|
| CHANNEL M | A | B | C |
| CHANNEL M+1 | UNASSIGNED | UNASSIGNED | UNASSIGNED |

| | S1 | S2 | S3 |
|---|---|---|---|
| CHANNEL M | C | C | C |
| CHANNEL M+1 | A | B | UNASSIGNED |

FIG.14(A)

| | S1 | S2 | S3 | S1 | S2 | S3 | S1 | S2 | S3 |
|---|---|---|---|---|---|---|---|---|---|
| CHANNEL M | A | B | D | A | B | D | A | B | D |
| CHANNEL M+1 | C | C | C | C | C | C | C | C | C |

FIG.14(B)

| | S1 | S2 | S3 | S1 | S2 | S3 | S1 | S2 | S3 |
|---|---|---|---|---|---|---|---|---|---|
| CHANNEL M | A | B | D | A | B | D | A | B | D |
| CHANNEL M+1 | C | E | UNASSIGNED | C | E | UNASSIGNED | C | E | UNASSIGNED |

FIG.15(A)

| | S1 | S2 | S3 | S1 | S2 | S3 | S1 | S2 | S3 |
|---|---|---|---|---|---|---|---|---|---|
| CHANNEL M | A | B | D | A | B | D | A | B | D |
| CHANNEL M+1 | C | C | C | C | C | C | C | C | C |

FIG.15(B)

| | S1 | S2 | S3 | S1 | S2 | S3 | S1 | S2 | S3 |
|---|---|---|---|---|---|---|---|---|---|
| CHANNEL M | A | B | D | A | B | D | A | B | D |
| CHANNEL M+1 | C | C | E | C | C | E | C | C | E |

FIG.16(A)

| | S1 | S2 | S3 | S1 | S2 | S3 | S1 | S2 | S3 |
|---|---|---|---|---|---|---|---|---|---|
| CHANNEL M | A | UNASSIGNED | C | A | UNASSIGNED | C | A | UNASSIGNED | C |
| CHANNEL M+1 | UNASSIGNED | B | UNASSIGNED | UNASSIGNED | B | UNASSIGNED | UNASSIGNED | B | UNASSIGNED |

FIG.16(B)

| | S1 | S2 | S3 | S1 | S2 | S3 | S1 | S2 | S3 |
|---|---|---|---|---|---|---|---|---|---|
| CHANNEL M | A | B | C | A | B | C | A | B | C |
| CHANNEL M+1 | UNASSIGNED | UNASSIGNED | UNASSIGNED | UNASSIGNED | UNASSIGNED | UNASSIGNED | UNASSIGNED | UNASSIGNED | UNASSIGNED |

METHOD FOR ALLOCATING RADIO CHANNEL FOR RADIO COMMUNICATION

TECHNICAL FIELD

The present invention relates to a method of radio channel assignment for radio communications between one base station and a plurality of radio terminals which are in its radio zone, such as portable radiotelephones, cordless telephones and personal handy phones (PHS).

BACKGROUND ART

Figure 1:
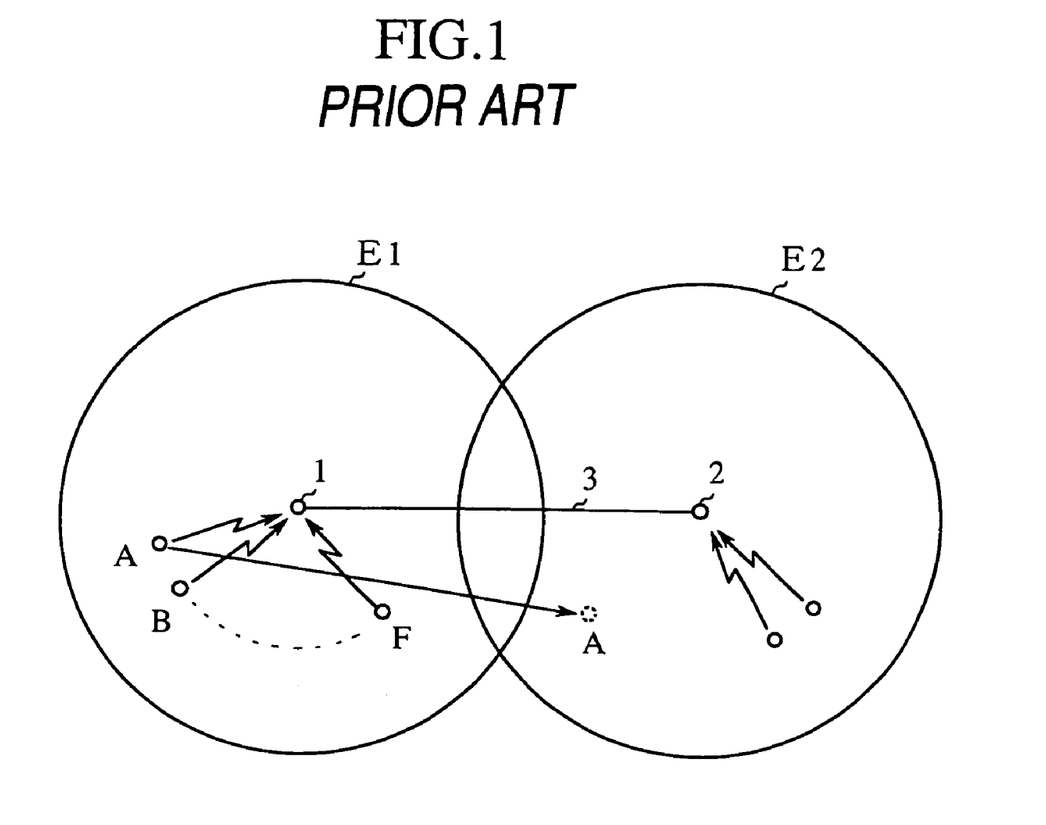
FIG. 1 is a diagram illustrating a communication network system.

FIG. 1 is a diagrammatic showing of the configuration of a conventional communication network system, in which base stations 1 and 2 of radio zones respectively E1 and E2 are interconnected through a public switched telephone network 3. Radio terminals A to F in radio zone E1 communicate with the base station 1, for example, by frequency division multiple access (FDMA) or time division multiple access (TDMA).

In this instance, when radio terminals A to F are used as ordinary telephones, the amount of data for communication (hereafter communication data) is constant, and hence they need only to be assigned a radio channel of a fixed channel capacity. However during data communication, the amount of communication data increases or decreases according to the state of access. When the amount of communication data increases, if such channel capacity factors as the number of channels and slots and the frequency bandwidth remain unchanged despite an increased amount of data, resources run short which results in a failure to achieve a satisfactory transmission speed. On the contrary, when the amount of communication data decreases, the degree of unused resources increases and radio channels are not effectively used.

To overcome the above drawbacks, a method has been proposed which employs small-capacity and large-capacity radio channels each provided separately and selectively switches them according to the amount of communication data as disclosed, for example, in Pat. Appln. Laid-Open Gazette No. 97824/96.

However, when the number of communication terminals that use only the small-capacity radio channels is larger than the total number of small-capacity radio channels, some of the communication terminals cannot be assigned radio channels. Furthermore the assignment of large-capacity radio channels to such communication terminals will inevitably give arise to a problem of ineffective use of radio channels.

The present invention is intended to solve the above problem, and has the object of increasing the speed of data communication and reducing waste in the use of radio channels through the effective utilization of a limited number of channels on the basis of changing the number of channels, the number of slots, the frequency bandwidth, or similar channel factors in accordance with the amount of communication data or the rate of change in the amount of communication data per unit time.

DISCLOSURE OF THE INVENTION

According to an aspect of the present invention, in a radio channel assignment method for radio communication between a base station and a plurality of radio terminals in its radio zone, it is possible to speed up data communication and reduce inefficient use of radio channels through effective use of a limited number of radio channels by increasing or decreasing the number of radio channels in accordance with the amount of communication data between the base station and each radio terminal.

According to another aspect of the present invention, it is possible to speed up data communication and reduce inefficient use of radio channels through effective use of a limited number of radio channels by decreasing the number of radio channels when the amount of communication data is smaller than a preset reference value, and by assigning a plurality of radio channels to the radio terminal concerned when the amount of communication data is larger than a preset reference value.

According to another aspect of the present invention, it is possible to speed up data communication by assigning a plurality of consecutive available radio channels to the radio terminal concerned when the amount of communication data is larger than a preset reference value.

According to another aspect of the present invention, it is possible to speed up the data communication by sending a radio channel assignment message from the base station to the radio terminal concerned in order to change the radio channel assigned thereto to a plurality of consecutive available radio channels.

According to another aspect of the present invention, it is possible to speed up the data communication by sending a radio channel assignment message from the radio terminal concerned to the base station in order to change the radio channel assigned so far to a plurality of consecutive available radio channels.

According to another aspect of the present invention, it is possible to speed up data communication and reduce inefficient use of radio channels through effective use of a limited number of radio channels by assigning with a new radio channel to a radio terminal assigned a radio channel which is one of a plurality of consecutive available radio channels required for another radio terminal.

According to another aspect of the present invention, it is possible to speed up data communication and reduce inefficient use of radio channels through effective use of a limited number of radio channels by sending a radio channel assignment request message from the base station to a radio terminal assigned with a radio channel which is one of a plurality of consecutive available radio channels required for another radio terminal and by assigning a different radio channel to the radio terminal concerned.

According to another aspect of the present invention, it is possible to speed up data communication and reduce inefficient use of radio channels through effective use of a limited number of radio channels by sending a radio channel assignment request message from the a radio terminal concerned to the base station, by sending thereto a radio channel assignment message to the radio terminal assigned with a radio channel required by another radio terminal, and by assigning a different radio channel to the radio terminal concerned.

According to another aspect of the present invention, it is possible to increase the number of terminals that can be simultaneously connected to the base station, by decreasing the number of channels assigned per terminal through effective utilization of a limited number of radio channels. This is achieved by decreasing the number of radio channels assigned to a radio terminal to make one of them unassigned when a radio terminal is newly connected to the base station.

According to another aspect of the present invention, it is possible to reduce inefficient use of radio channels through effective utilization of a limited number of radio channels by assigning a radio channel, made unassigned by changing the radio channel assignment, to a radio terminal required to carry out communication over a plurality of radio channels.

According to another aspect of the present invention, it is possible to speed up data communication and reduce inefficient use of radio channels through effective use of a limited number of radio channels by providing frequency division multiple access channels between the radio terminals and the base station.

According to another aspect of the present invention, it is possible to speed up data communication and reduce inefficient use of radio channels through effective use of a limited number of radio channels by the provision of time division multiple access channels between the radio terminals and the base station.

According to another aspect of the present invention, in a radio channel assignment method for radio communications between a base station and a plurality of radio terminals in its radio zone, it is possible to speed up the data communication and reduce inefficient use of radio channels through effective use of a limited number of radio channels by determining the number of radio channels to be assigned, by the base station, in accordance with the rate of change of the amount of stored data per unit time.

According to another aspect of the present invention, in a radio channel assignment method for radio communications between a base station and a plurality of radio terminals in the radio zone of the base station, it is possible to speed up the data communication and reduce inefficient use of radio channels through effective use of a limited number of radio channels by determining the number of radio channels to be assigned, by each radio terminal, in accordance with the rate of change of the amount of stored data per unit time.

According to still another aspect of the present invention, in a radio channel assignment method for radio communication between a base station and a plurality of radio terminals staying in the radio zone of the base station, it is possible to speed up the data communication and reduce inefficient use of radio channels through effective use of a limited number of radio channels by sending, upon occurrence of a hand-over, the number of assigned channels to a base station with which the radio terminal newly communicates.

BEST MODE FOR CARRYING OUT THE INVENTION

To facilitate a better understanding of the present invention, a detailed description will be given, with reference to the accompanying drawings, of the best mode for carrying out the invention.

Embodiment 1

Figure 2:
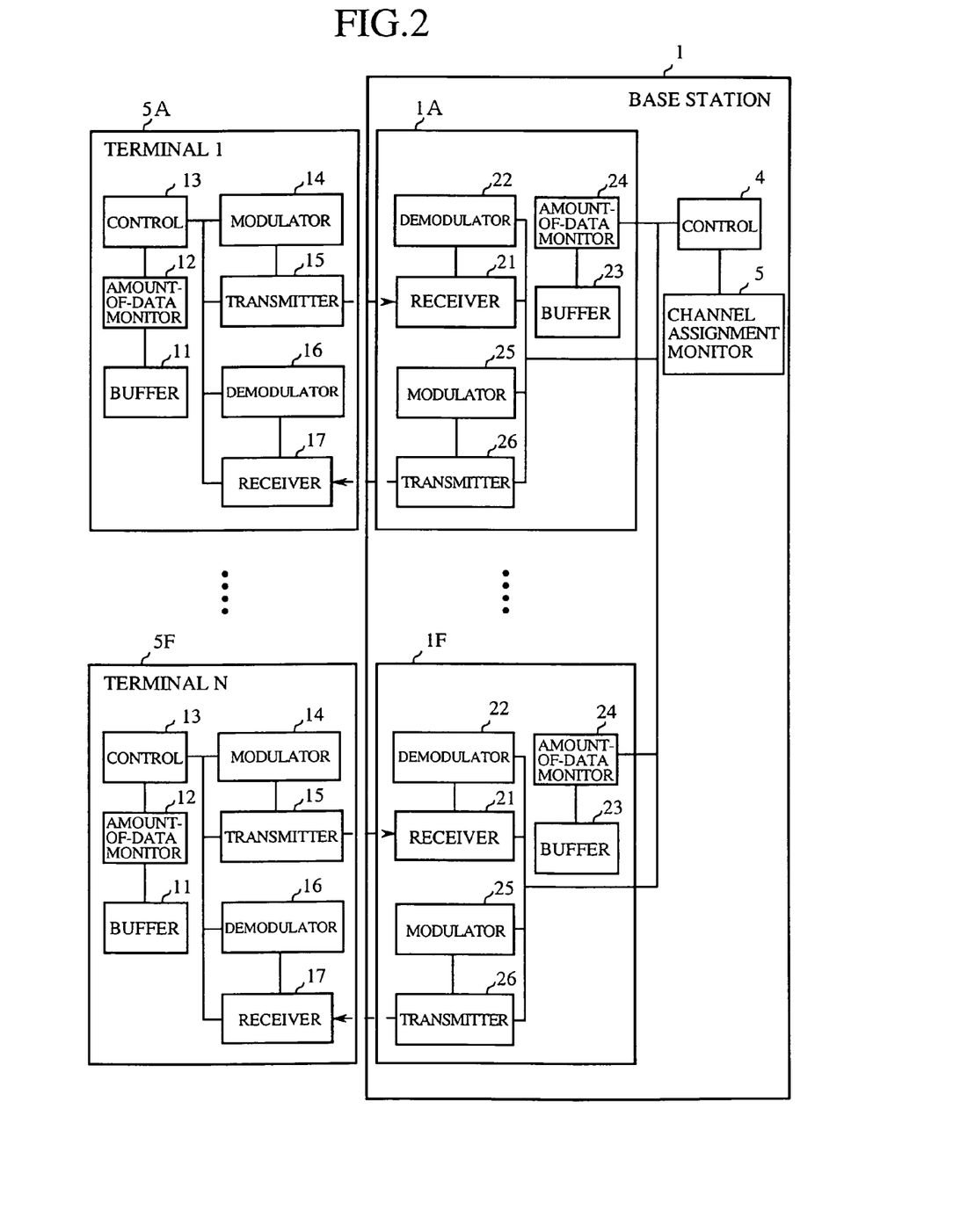
FIG. 2 is a block diagram depicting the configuration of a radio communication system in which a plurality of radio terminals communicate with one base station by frequency division multiple access (FDMA)

FIG. 2 is a block diagram depicting a radio communication system according to Embodiment 1 of the present invention in which a plurality of radio terminals A (5A) to F (5F) communicate with one base station 1 by frequency division multiple access (FDMA).

The radio terminals A (5A) to F (5F) are each composed of: a buffer 11 for storing data to be sent; an amount-of-data monitor 12 for detecting the amount of data stored in the buffer 11, for example, in terms of software under program control; a controller 13 for controlling the radio terminal; a modulator 14 which performs modulation (changing the bandwidth) as determined by the controller 13; a transmitter 15; a demodulator 16; and a receiver 17.

The base station 1 is provided with: individual base stations 1A to 1F corresponding to the radio terminals A (5A) to F (5F), respectively; a controller 4 for controlling the individual base stations 1A to 1F; and a channel assignment monitor 5 for monitoring the channel assignment of the base station 1.

The individual base stations 1A to 1F are each made up of: a receiver 21; a demodulator 22; a buffer 23 for storing received data; an amount-of-data monitor 24 for detecting the amount of data stored in the buffer 23, for example, in terms of software under program control; a modulator 25; and a transmitter 26.

Next, the operation of this embodiment will be described below.

The radio terminal A (5A): stores communication data in the buffer 11; monitors the amount of data stored therein by the amount-of-data monitor 12; decides a required channel capacity for communication, by the controller 13 based on the result of monitoring; and sends a channel capacity change request message based on the decision result to the individual base station 1A via the modulator 14 from the transmitter 15.

The individual base station 1A: demodulates the signal received by the receiver 21 with the demodulator 22; checks the demodulated data by the controller 4; determines whether or not to respond to an inquiry of the radio channel assignment request message from the radio terminal A (5A), based on the result of monitoring by the monitor 5; and sends the determination result from the controller 4 to the radio terminal A (5A) via the modulator 25 and the transmitter 26 of the individual base station 1A.

Based on a radio channel assignment permission message sent from the individual base station 1A, the radio terminal A (5A) sends communication data from the buffer 11 by the transmitter 15 via the modulator 15 to the individual base station 1A.

A description will be given below of varying the radio channel in response to a change in the amount of communication data.

Figure 3A:
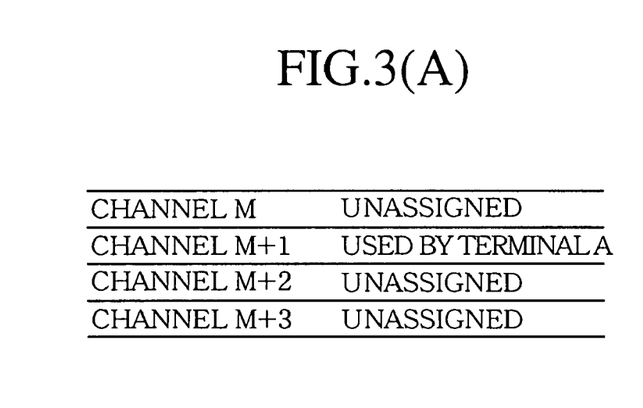
FIG. 3 is an explanatory diagram of variation in radio channel assignment when the amount of communication data is larger than a preset threshold.
Figure 3B:
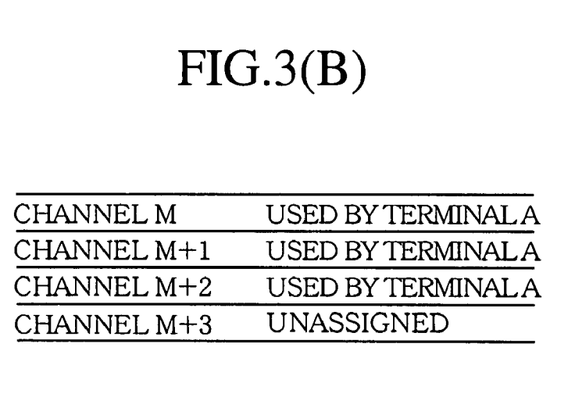

1. When the amount of communication data is larger than a preset threshold:

When a channel M+1 is set for the radio terminal A (5A) as depicted in FIG. 3(a), if the amount of communication data exceeds the channel capacity of the channel M+1, the radio terminal A (5A) requests the individual base station 1A to use, for example, channels M and M+2 adjacent the channel M+1 as shown in FIG. 3(b). On receiving permission from the individual base station 1, the radio terminal A (5A) sets the three adjoining channels for its use. Thus, even if the amount of communication data increases, no increase will be caused in the amount communication time.

Figure 4A:
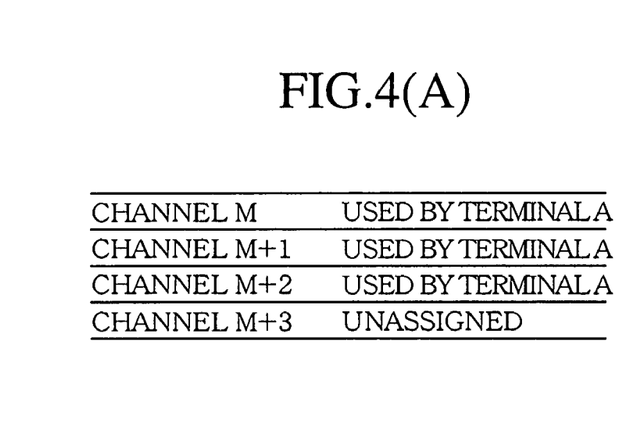
FIG. 4 is an explanatory diagram of the variation in the radio channel assignment when the amount of communication data is smaller than the preset threshold.
Figure 4B:
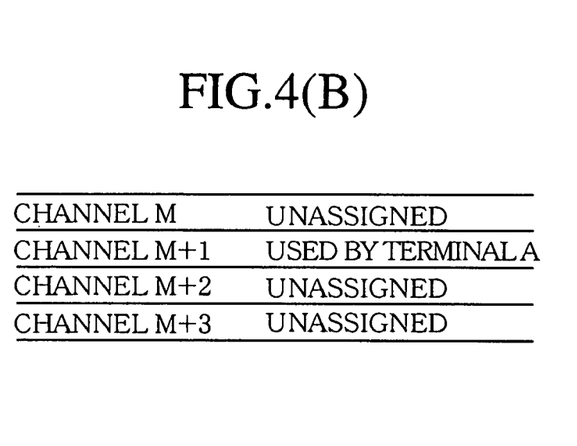

2. When the amount of communication data is smaller than a preset threshold:

When three channels M through M+2 are set as radio channels for the radio terminal A (5A) as depicted in FIG. 4(a), if the amount of communication data becomes smaller than the channel capacity of the channel M+1, the radio terminal A (5A) sends, to the individual base station 1A, a radio channel assignment request message to use only the channel M+1 as shown in FIG. 4(b). After receiving permission from the individual base station 1A, the radio terminal uses that channel alone. Thus, even if the amount of communication data decreases, it is possible to continue communication without wasting channel capacity.

Figure 5A:
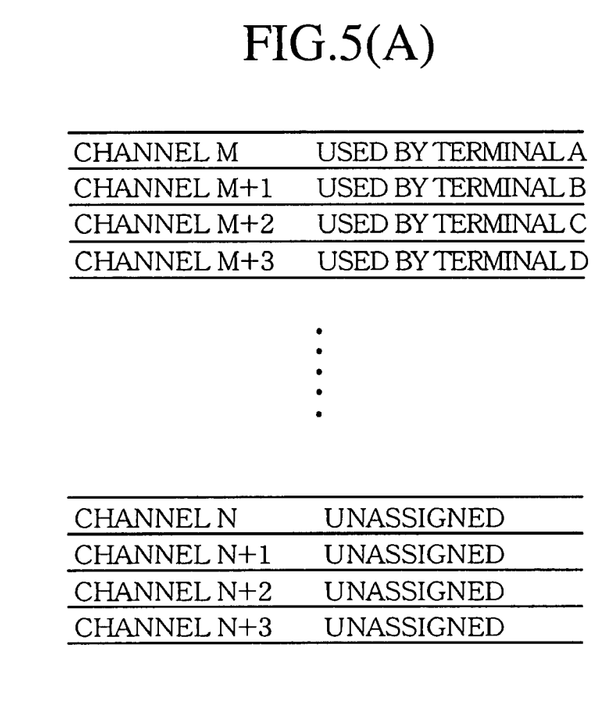
FIG. 5 is an explanatory diagram of the variation in radio channel assignment when a terminal C, which uses a plurality of channels, hops.
Figure 5B:
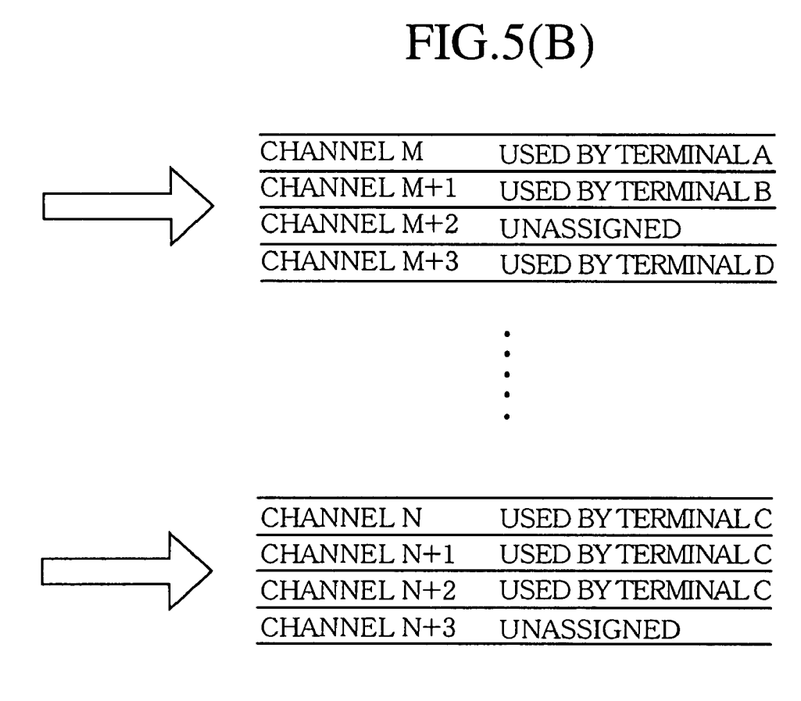

3. When a radio terminal C (5C not shown) that uses a plurality of channels hops:

When the radio terminals A (5A) through D (5D) are assigned the channels M through M+3 as shown FIG. 5(a), if the amount of communication data from the radio terminal C (5C) becomes larger than the channel capacity of the channel M+2, the radio terminal C sends a channel assignment request message to the individual base station 1C (not shown) as depicted in FIG. 3(b). Upon receiving the channel assignment request message, the individual base station 1C requests a channel assignment from the controller 4. Based on the channel assignment status stored in the channel assignment monitor 5, the controller 4 posts a plurality of consecutive channels N, N+1 and N+2 to the individual base station 1C, which, in turn, sends a channel assignment permission message to the radio terminal C to permit the use of the channels N, N+1 and N+2. Upon receiving the permission from the individual base station 1C, the radio terminal C sets the three channels for its use. Thus, even if the amount of communication data increases, it is possible to continue communication without affecting the adjoining channels and without causing an increase in the amount of communication time.

Figure 6A:
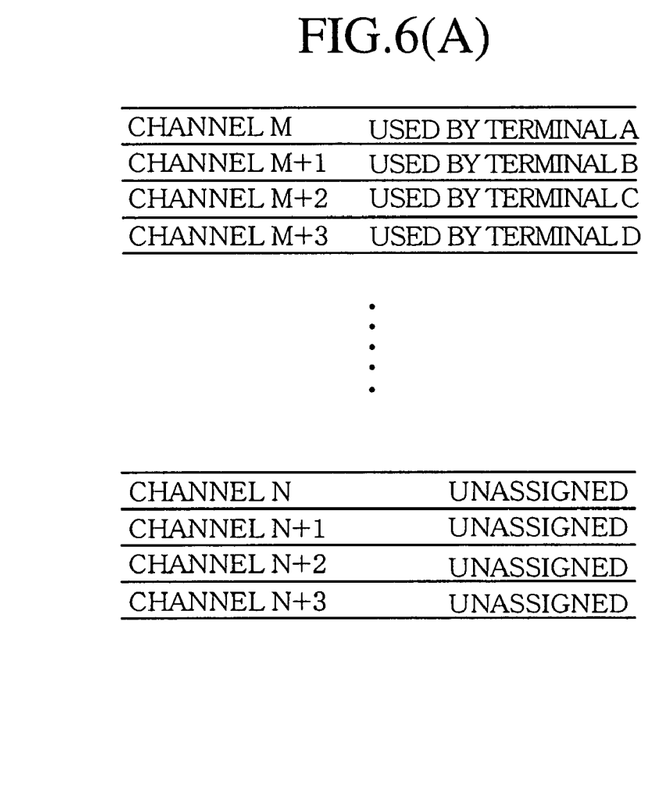
FIG. 6 is an explanatory diagram of variation in radio channel assignment when a terminal adjacent the terminal C, which uses a plurality of channels, hops.
Figure 6B:
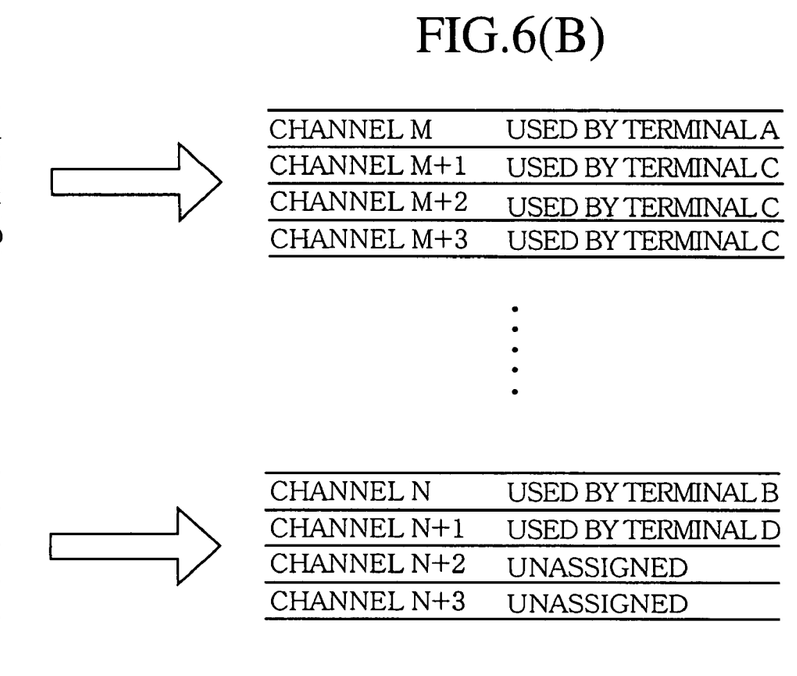

4. When a radio terminal adjacent the radio terminal C (5C) that uses a plurality of channels hops:

When the channels M through M+3 are set as radio channels for the radio terminals A (5A) through D (5D) as depicted in FIG. 6(a), if the amount of communication data from the radio terminal C (5C) becomes larger than the channel capacity of the channel M+2, the radio terminal C (5C) sends a channel assignment request message to the individual base station 1C (not shown) as depicted in FIG. 6(b). Upon receiving the channel assignment request message, the individual base station 1C requests a channel assignment from the controller 4. Based on the channel assignment status stored in the channel assignment monitor 5, the controller 4 instructs the individual base stations 1B and 1D to use channels N and N+1. The individual base stations 1B and 1D post, by a channel assignment permission message, to the radio terminals B and D the assignment thereto of the channels N and N+, respectively. The individual base station 1C posts, by a channel assignment permission message, to the radio terminal C the assignment thereto of the channels M, M+1 and M+2. Thus, even if the amount of communication data increases, it is possible to continue communication without affecting the adjoining channels and without causing an increase in the amount of communication time.

Figure 7A:
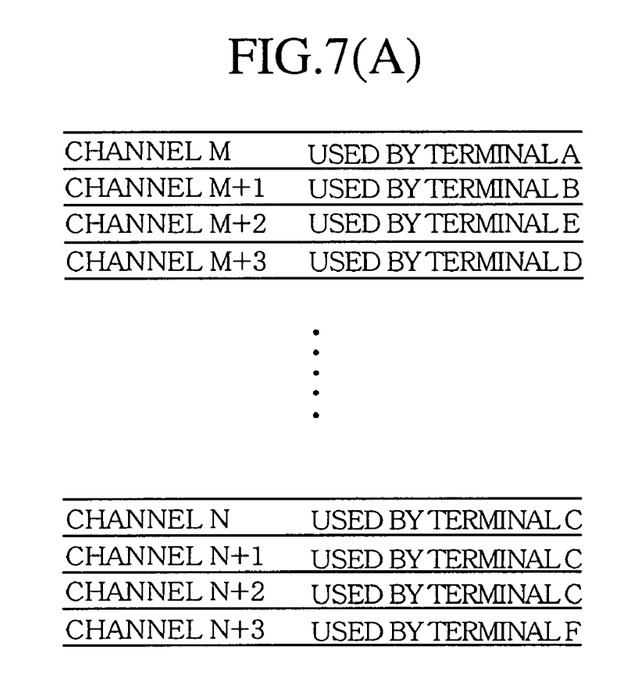
FIG. 7 is an explanatory diagram of variation in radio channel assignment in the absence of available channels.
Figure 7B:
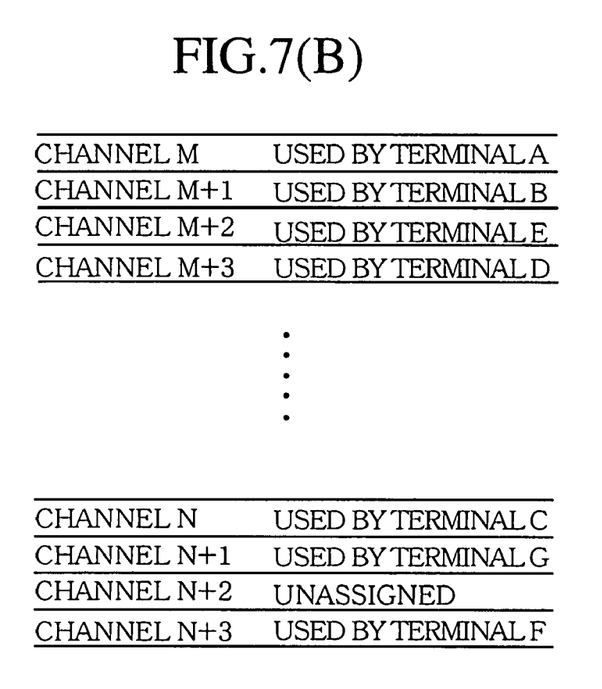

5. When no channels are available:

In the case where all the channels are set for the radio terminals A (5A) through f (5F) and no channels are available as depicted in FIG. 7(A), if a radio terminal G (5G, not shown) sends a radio channel assignment message to an individual base station 1G, then the controller 4 reduces the three channels set for the radio terminal C (5C) to one channel, and sets the one available channel N+1 as a radio terminal G (5G) and the other channel N+2 as an unassigned channel as shown in FIG. 7(b). As a result, although the transmission speed of the radio terminal C (5C) decreases, the radio terminal G (5G) can carry out communication.

Figure 8A:
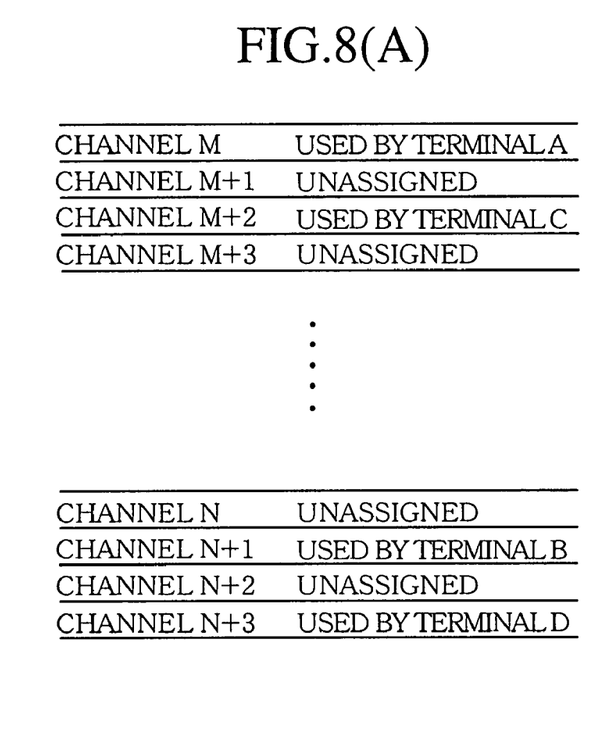
FIG. 8 is an explanatory diagram of variation in radio channel assignment when fragmented channels are gathered together.
Figure 8B:
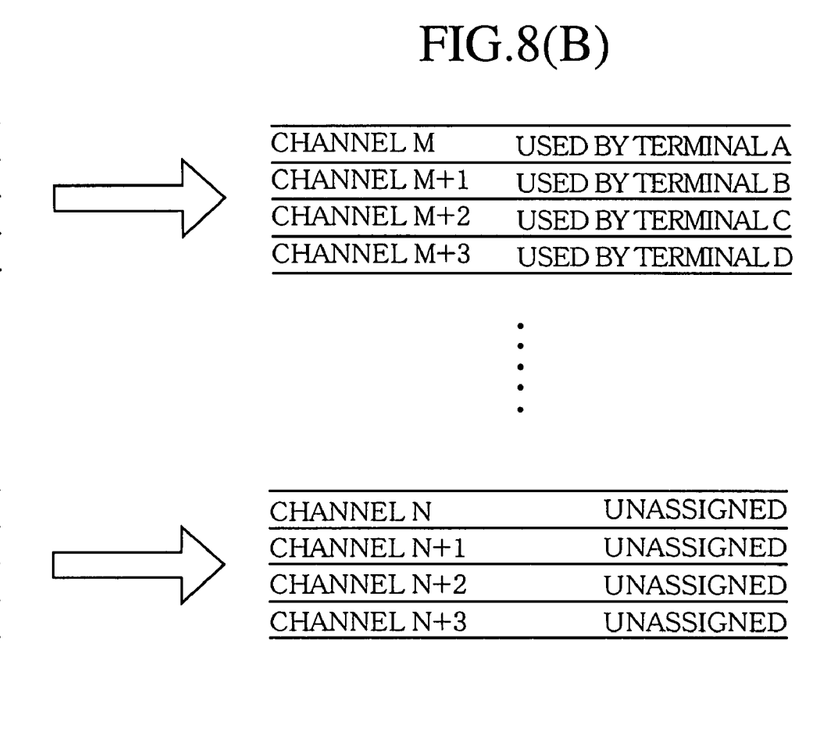

6. Fragmented unassigned channels are gathered together:

When the channels M, M+2, N+1 and N+3 are set to the radio terminals A (5A), B (5B), C (5C) and D (5D), respectively, as shown in FIG. 8(a), the individual base stations 1B and 1D (not shown) send radio channel assignment messages to the radio terminal B (5B) and D (5D) to assign the channels M+1 and M+3, respectively, as depicted in FIG. 8(b). As a result, the unassigned channels can be gathered together without inhibiting communication.

Embodiment 2

Figure 9:
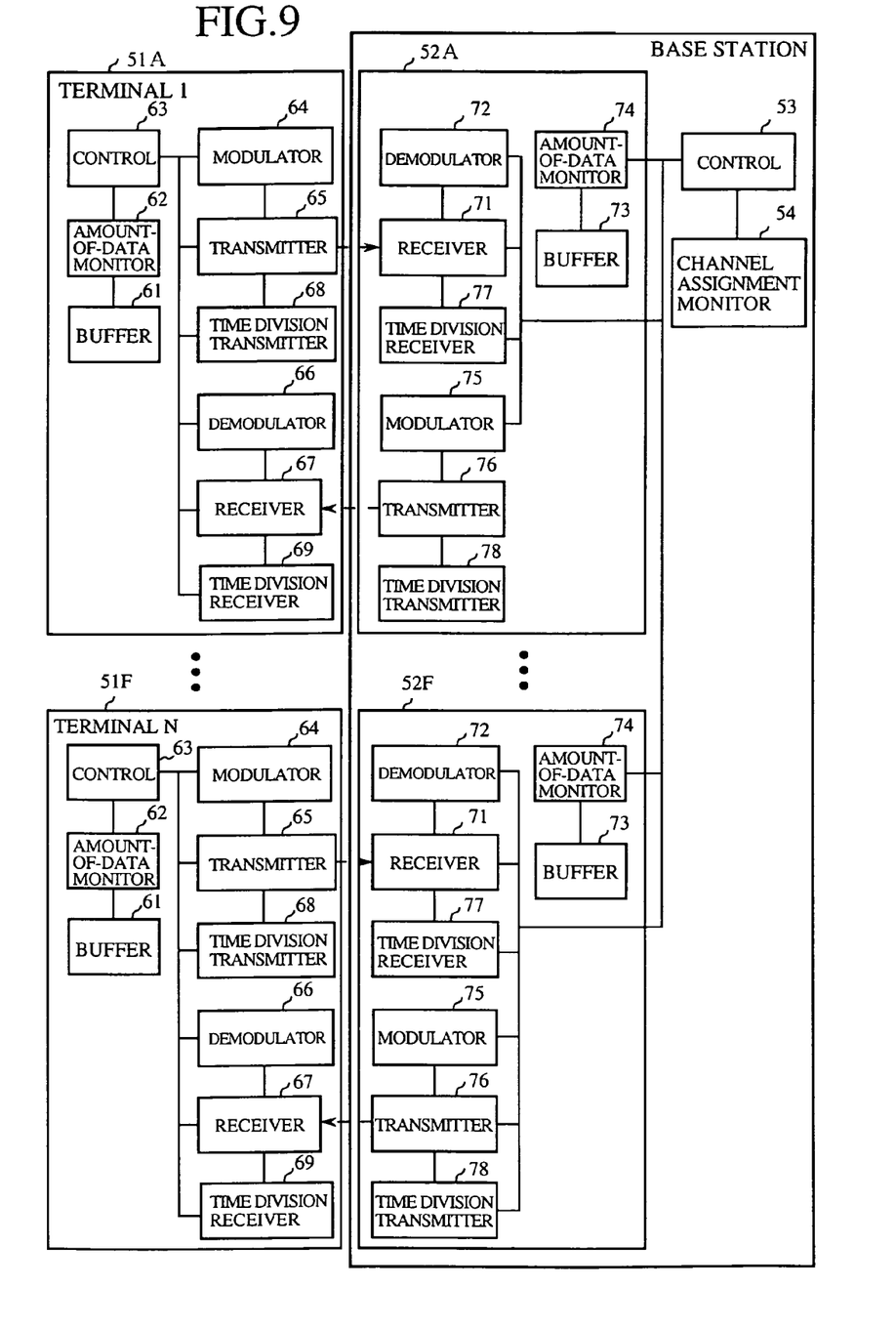
FIG. 9 is a block diagram illustrating the configuration of a radio communication system in which a plurality of radio terminals communicate with one base station by time division multiple access (TDMA)

FIG. 9 is a block diagram illustrating the configuration of a radio communication system according to Embodiment 2 of the present invention in which a plurality of radio terminals communicate through a single base station by time division multiple access (TDMA). In FIG. 9, reference characters A (51A) to F (51F) denote radio terminals, and 52 a base station. The radio terminals A (51A) to F (51F) are each composed of: a buffer 61 for storing data to send; an amount-of-data monitor 62 for detecting the amount of data stored in the buffer 61, for example, in terms of software under program control; a controller 63 for controlling the radio terminal; a modulator 64; a transmitter 65; a demodulator 66; a receiver 67; a time-division transmitter 68 for determining transmission timing; and a time-division receiver 69 for determining reception timing.

The base station 52 comprises: individual base stations 52A to 52F correspond to the radio terminals A (51A) to F (511F), respectively; a controller 53 for controlling the individual base stations 52A to 52F; and a channel assignment monitor 54 for monitoring the channel assignment of the base station 52.

The individual base stations 52A to 52F are each made up of: a receiver 71; a demodulator 72; a buffer 73 for storing received data; an amount-of-data monitor 74 for detecting the amount of data stored in the buffer 73, for example, in terms of software under program control; a modulator 75; a transmitter 76; time-division receiver 77 for determining reception timing; and a time-division transmitter 78 for determining transmission timing.

Next, the operation of this embodiment will be described below.

The radio terminal A (51A): stores communication data in the buffer 61; monitors the amount of data stored therein by the amount-of-data monitor 62; decides a required channel capacity for communication, by the controller 63 based on the result of monitoring; and sends a channel capacity change request message based on the decision result to the base station 52 via the modulator 64 from the transmitter 65 at the transmission timing provided from the time-division transmitter 69.

The individual base station 52A uses the demodulator 22 to demodulate the signal received by the receiver 71 at the reception timing provided from the time-division receiver 77. It checks the demodulated data by the controller 53, determines whether or not to respond to the radio channel assignment request message from the radio terminal A (51A), based on the result of monitoring by the monitor 54, and sends the determination result from the controller 53 of the base station 52 to the radio terminal A (51A) via the modulator 75 and the transmitter 76 of the individual base station 52A at the timing for transmission provided by the time-division transmitter 78.

The radio terminal A (51A): receives the instruction signal from the individual base station 52A at the reception timing provided by the time-division receiver 67; and sends the communication data, stored in the buffer 61, via the modulator 64 to the base station 52A from the transmitter 65 over the radio channel instructed by the base station 52A.

A description will be given below of the variation in the radio channel with a change in the amount of communication data.

Figure 10A:
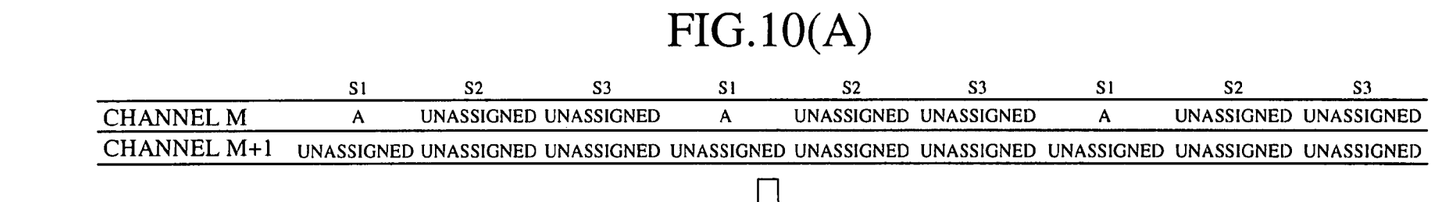
FIG. 10 is an explanatory diagram of variation in radio channel assignment when the amount of communication data is larger than a preset threshold.
Figure 10B:
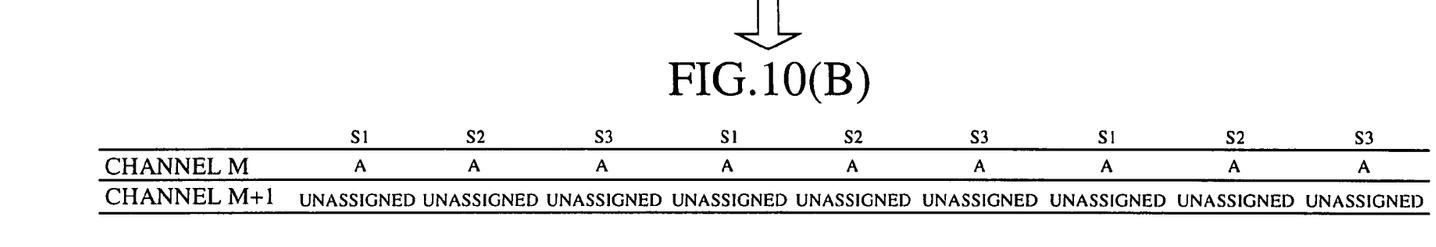

7. When the amount of communication data is larger than a preset threshold:

When a slot S1 of a channel M is set as a radio channel for the radio terminal A (51A) as depicted in FIG. 10(a), if the amount of communication data becomes larger than the channel capacity of the slot S1 of the channel M, the radio terminal A (51A) sends a channel assignment request message to the individual base station 52A as shown in FIG. 10(b). Upon receiving the channel assignment request message, the individual base station 52A requests a channel assignment of the controller 53, and based on the channel assignment status stored in the channel assignment monitor 54, the controller 53 posts a plurality of consecutive slots S1 to S3 of the channel M to the individual base station 52A; and the individual base station 52A posts the slots S1 to S3 of the channel M to the radio terminal A (51A) by a channel assignment permission message. Upon receiving the permission from the individual base station 52A, the radio terminal A (51A) uses the slots S1 to S3 for communication. Thus, even if the amount of communication data increases, the time for communication will not increase.

Figure 11A:
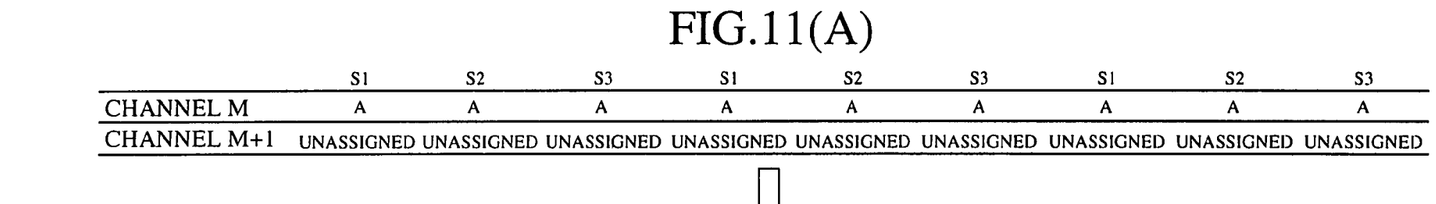
FIG. 11 is an explanatory diagram of variation in radio channel assignment when the amount of communication data is smaller than the preset threshold.
Figure 11B:
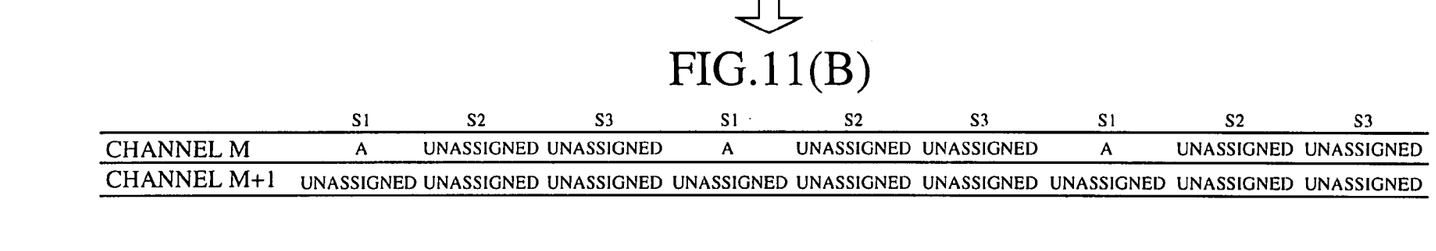

8. When the amount of communication data is smaller than a preset threshold:

When all the slots S1 to S3 of the channel M are set as a radio channel for the radio terminal A (51A) as depicted in FIG. 11(a), if the amount of communication data becomes smaller than the channel capacity of the slot S1, the radio terminal A (51A) sends a channel assignment request message to the individual base station 52A as shown in FIG. 11(b). Upon receiving the channel assignment request message, the individual base station 52A requests a channel assignment of the controller 53, and based on the channel assignment status stored in the channel assignment monitor 54, the controller 53 posts the slot S1 of the channel M containing a plurality of consecutive slots to the individual base station 52A; and the individual base station 52A posts the slot S1 the channel M to the radio terminal A (51A) by a channel assignment permission message. Upon receiving the permission from the individual base station 52A, the radio terminal A (51A) uses the slot S1 for communication. Thus, even if the amount of communication data decreases, it is possible to continue communication without wasting channel capacity.

Figure 12A:
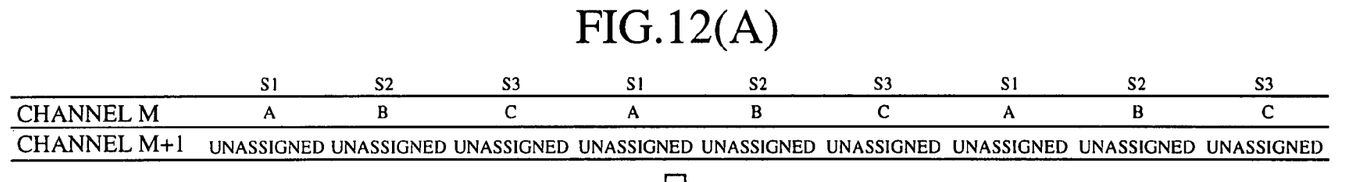
FIG. 12 is an explanatory diagram of variation in radio channel assignment when a terminal C, which uses a plurality of slots, hops.
Figure 12B:
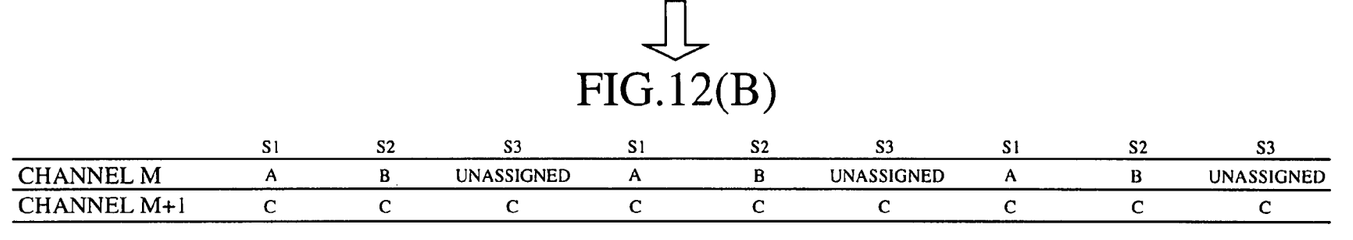

9. When the radio terminal C (51C) that uses a plurality of slots hops:

When all the slots S1, S2 and S3 of the channel M are set as radio channels for the radio terminals A (51A), B (51B) and C (51C) and all slots of the channel M+1 are unassigned as shown FIG. 12(a), the radio terminal C (51C) sends a channel assignment request message to the individual base station 52C (not shown) as depicted in FIG. 12(b) on an increase in the amount of communication data. Upon receiving the channel assignment request message, the individual base station 52C requests a channel assignment of the controller 53. Based on the channel assignment status stored in the channel assignment monitor 54, the controller 53 posts a plurality of consecutive slots S1 to S3 of the channel M+1 to the individual base station 52C. The individual base station 52C sends a channel assignment permission message to the radio terminal C (51C) to post thereto the slots S1 to S3 of the channel M+1. Upon receiving the permission from the individual base station 52C, the radio terminal C (51C) sets the three slots S1 to S3 for its use. Thus, even if the amount of communication data increases, it is possible to continue the communication without causing an increase in the amount of time for communication. In this instance, the slot S3 of the channel M becomes unassigned.

Figure 13A:
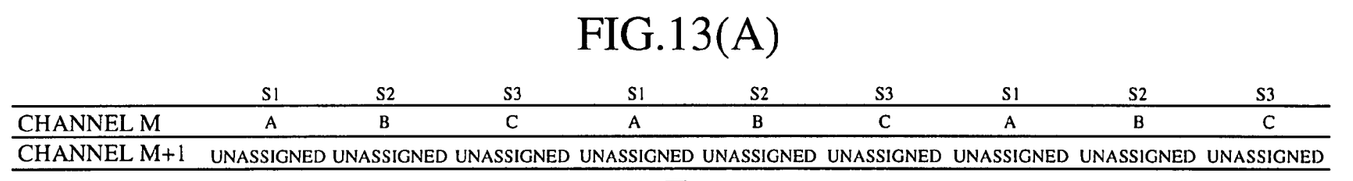
FIG. 13 is an explanatory diagram of variation in radio channel assignment when a terminal adjacent the terminal C, which uses a plurality of slots, hops.
Figure 13B:
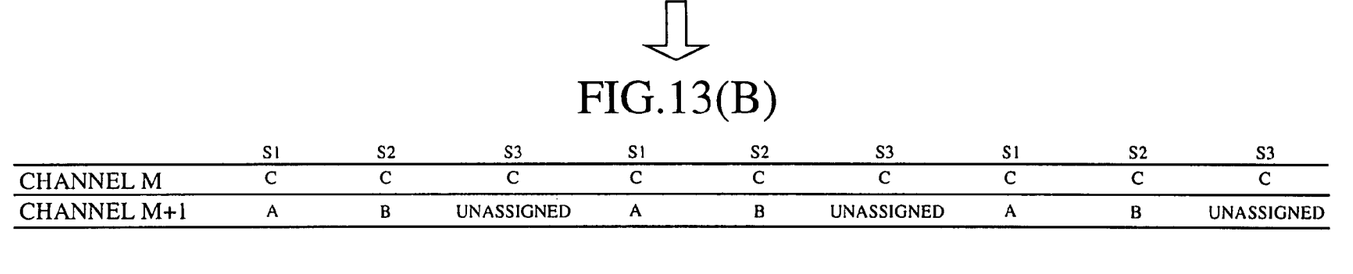

10. When a radio terminal adjacent the radio terminal C (51C) that uses a plurality of slots hops:

When all the slots S1, S2 and S3 of the channel M are set as radio channels for the radio terminals A (51A), B (51B) and C (51C) and all the slots of the channel M+1 are unassigned as depicted in FIG. 13(a), the radio terminal C (51C) sends a channel assignment request message to the individual base station 1C (not shown) as depicted in FIG. 13(b). Upon receiving the channel assignment request message, the individual base station 52C requests a channel assignment of the controller 53. Based on the channel assignment status stored in the channel assignment monitor 54, the controller 53 posts the slots S1 to S3 of the channel M to the individual base station 52C, the slot S1 of the channel M+1 to the individual base station 52A and the slot S2 of the channel M+1 to the individual base station 52B as shown in FIG. 12(*b*). The individual base station 52 posts all the slots of the channel M to the radio terminal C (51C) by a channel assignment permission message. The individual base station 52 posts the slot S1 of the channel M+1 to the radio terminal A (51A) by a channel assignment permission message, and the individual base station 52 posts the slot S1 of the channel M+1 to the radio terminal B (51B) by a channel assignment permission message.

The radio terminal C (51C) is set to use all the slots of the channel M. And, the radio terminal A (51A) is set to use the slot S1 of the channel M+1, and the radio terminal B (51B) is set to use the slot S1 of the channel M+1. Thus, even if the amount of communication data increases, it is possible to continue the communication without causing an increase in the amount of time for communication.

Figure 14A:
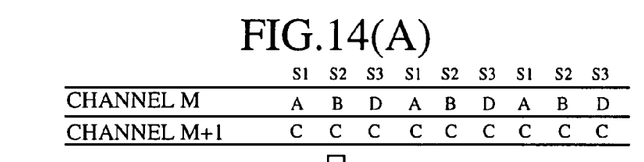
FIG. 14 is an explanatory diagram of variation in radio channel assignment for decreasing the number of slots assigned to channel C down to one when no slots are available.
Figure 14B:
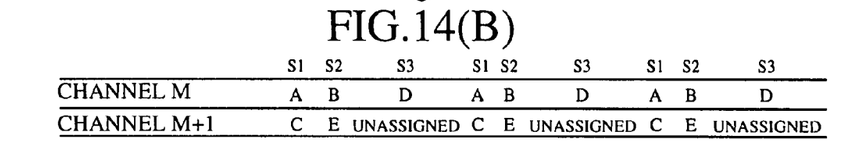

11. When no channels are available (when one slot is assigned to the radio terminal C (51C):

In the case where all the slots S1, S2 and S3 of the channel M are set as radio channels for the radio terminals A (51A), B (51B) and D (51D) and all the slots S1 to S3 of the channel M+1 are set as a radio channel for the radio terminal C (51C) as depicted in FIG. 14(*a*), if a radio terminal E (51E, not shown) sends a radio channel assignment message, then an individual base station 52E requests a channel assignment of the controller 53 on receipt of the channel assignment request message. Based on the channel assignment status stored in the channel assignment monitor 54, the controller 53 posts, by channel assignment messages, the slot S1 of the channel M+1 to the individual base station 52C and the slot S2 of the channel M+1 to the individual base station 52E as shown in FIG. 14(*b*). Accordingly, the individual base station 52C posts the slot S1 of the channel M+1 to the radio terminal C (51C), and the individual base station 52E posts the slot S2 of the channel M+1 to the radio terminal E (51E). As a result, although the transmission speed of the radio terminal C (5C) decreases, the radio terminal G (5G) can communicate, and the slot S3 of the channel M+1 becomes unassigned.

Figure 15A:
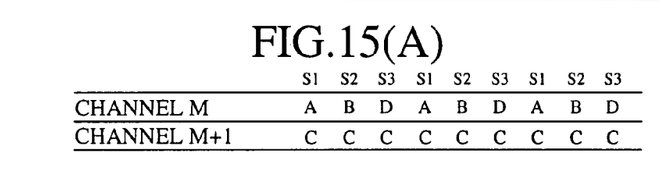
FIG. 15 is an explanatory diagram of variation in radio channel assignment for assigning one of the slots assigned to the terminal C to another terminal when no slots are available.
Figure 15B:
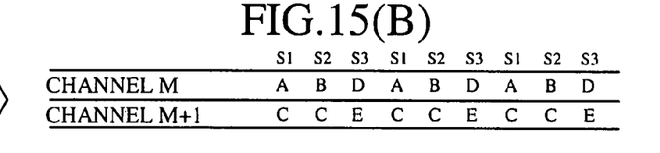

12. When no channels are available (when slots assigned to the radio terminal C (51C) are assigned to another radio terminal as required):

In the case where all the slots S1, S2 and S3 of the channel M are set as radio channels for the radio terminals A (51A), B (51B) and D (51D) and all the slots S1 to S3 of the channel M+1 are set as a radio channel for the radio terminal C (51C) as depicted in FIG. 15(*a*), if the radio terminal E (51E) (not shown) sends a radio channel assignment message, then the individual base station 52E having received the channel assignment request message requests a channel assignment of the controller 53, and based on the channel assignment status stored in the channel assignment monitor 54, the controller 53 posts, by channel assignment messages, the slots S1 and S2 of the channel M+1 to the individual base station 52C and the slot S3 of the channel M+1 to the individual base station 52E as shown in FIG. 15(*b*). Accordingly, the individual base station 52C posts the slots S1 and S2 of the channel M+1 to the radio terminal C (51C), and the individual base station 52E posts the slot S3 of the channel M+1 to the radio terminal E (51E). As a result, the transmission speed of the radio terminal C (51C) decreases, but the radio terminal E (51E) is allowed to carry out communication.

Figure 16A:
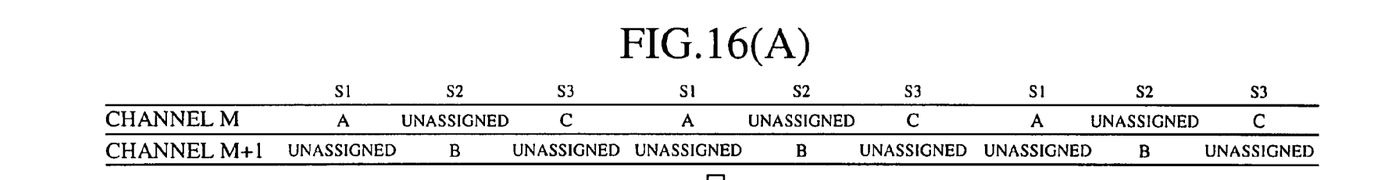
FIG. 16 is an explanatory diagram of variation in radio channel assignment when fragmented channels are gathered together.
Figure 16B:
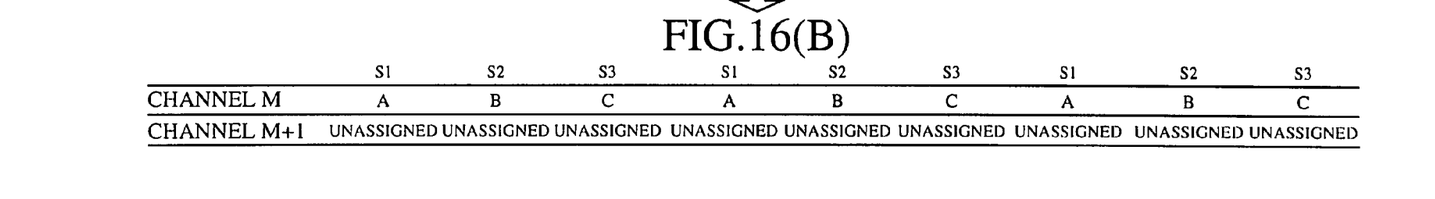

13. Fragmented unassigned channels are gathered together:

When the slots S1 and S3 of the channel M are set for the radio terminals A (51A) and C (51C) and the slot S2 of the channel M+1 for the radio terminal B (51B), as shown in FIG. 16(*a*), the individual base station 52B sends a radio channel assignment message to the radio terminal B (51B) to assign the slot S2 of the channels M as depicted in FIG. 16(*b*). As a result, the unassigned channels can be gathered together without inhibiting communication.

Figure 17:
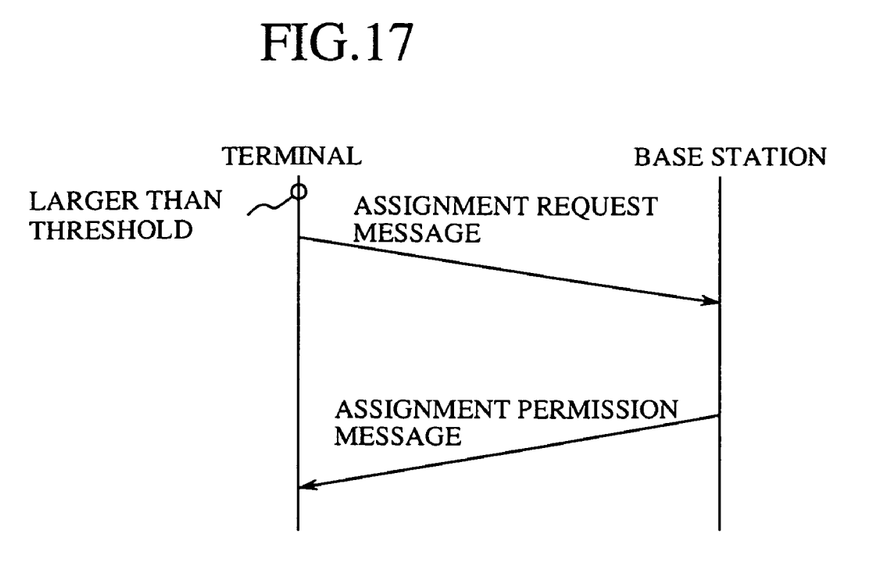
FIG. 17 is a diagram showing a sequence for the radio terminal side to request the base station side to change the radio channel assignment.
Figure 18:
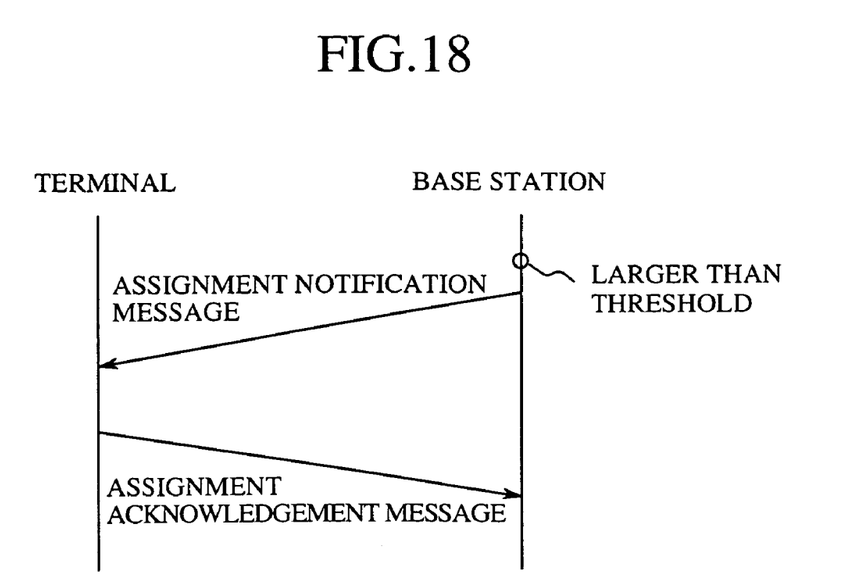
FIG. 18 is a diagram showing a sequence for the base station side to request the radio terminal side to change the radio channel assignment.

As described above, the assignment of radio channels between radio terminals and a base station can be changed by sending an assignment permission message from the base station side to the radio terminal side in response to a channel assignment change request from the latter to the former as shown in FIG. 17, or by sending an assignment permission message from the radio terminal side to the base station side in response to a channel assignment change request from the latter to the former as depicted in FIG. 18.

Embodiment 3

In the above embodiments channel assignment is varied depending on the amount of communication data. However varying channel assignment with the rate of change of communication data per unit time also allows effective use of a limited number of channels, speeds up data communication and reduces inefficient use of channels.

Embodiment 4

When the radio terminal A moves out of the radio zone of the base station 1 where it has carried out communication so far and into the radio zone of the other base station 2 in FIG. 1 (hand-over), it is possible to speed up data communication and reduce inefficient use of channels by posting the number of radio channels assigned to the radio terminal A up to that point to the base station upon occurrence of the hand-over.

INDUSTRIAL APPLICABILITY

As described above, the radio channel assignment method according to the present invention changes channel assignments in response to variation in the amount of communication data per unit time. Hence it permits speeding up data communication and reducing inefficient use of channels by effectively using a limited number of channels.

Furthermore, when a hand-over occurs, the number of channels used between the radio terminal concerned and the previous base station is posted to the new base station. In this way, it is possible to speed up data communication between the new base station and the radio terminal and reduce inefficient use of channels.

What is claimed is:

1. A radio channel assignment method for assigning radio channels for carrying out communications between a base station and a plurality of radio terminals in a radio zone of the base station, comprising the steps of:
assigning at least one radio channel to a first radio terminal in said radio zone;
determining the amount of communication data to be sent from said first radio terminal to said base station;
when the amount of communication data is determined to be above a predetermined threshold representing acceptable data transmission capacity for the number of presently assigned radio channels, requesting of said base station an increase in the number of radio channels assigned to said first radio terminal;

when the amount of communication data is determined to be below a predetermined threshold representing acceptable data transmission capacity for the number of presently assigned radio channels, requesting of said base station a decrease in the number of radio channels assigned to said first radio terminal;

in response to a request for an increase in the number of radio channels assigned to said first radio terminal, determining whether a predetermined number of radio channels in said radio zone adjacent to the radio channel assigned to said first radio terminal are unassigned, and if so assigning said predetermined number of adjacent radio channels to said first radio terminal; if a predetermined number of radio channels in said radio zone adjacent to the radio channel assigned to said first radio terminal are not unassigned, reassigning adjacent radio channels presently assigned to other radio terminals of said plurality of radio terminals to said first radio terminal, and assigning said other radio terminals to other unassigned radio channels in said radio zone.

2. The radio channel assignment method of claim 1, wherein when said amount of communication data is below said predetermined threshold, one radio channel is assigned to said first radio terminal, and when said amount of communication data is above said predetermined threshold, a plurality of adjacent radio channels are assigned to said first radio terminal.

3. The radio channel assignment method of claim 1, further comprising the step of decreasing the number of radio channels assigned to said first radio terminal upon receipt of a request for an assignment of a radio channel in said radio zone by a second radio terminal having no assigned radio channel in said radio zone.

4. The radio channel assignment method of claim 1, wherein said radio channels in said radio zone are frequency division multiple access channels.

5. The radio channel assignment method of claim 1, wherein said radio channels in said radio zone are time division multiple access channels.

6. A radio channel assignment method for assigning radio channels for carrying out communications between a base station and a plurality of radio terminals in a radio zone of the base station, comprising the steps of:

assigning at least one radio channel to a first radio terminal in said radio zone;

determining the amount of communication data to be sent from said first radio terminal to said base station;

when the amount of communication data is determined to be above a predetermined threshold representing acceptable data transmission capacity for the number of radio channels assigned to said first radio terminal;

when the amount of communication data is determined to be below a predetermined threshold representing acceptable data transmission capacity for the number of presently assigned radio channels, requesting of said base station a decrease in the number of radio channels assigned to said first radio terminal;

in response to a request for an increase in the number of radio channels assigned to said first radio terminal, determining whether a predetermined number of radio channels in said radio zone adjacent to the radio channel assigned to said first radio terminal are unassigned, and if so assigning said predetermined number of adjacent radio channels to said first radio terminal; if a predetermined number of radio channels in said radio zone adjacent to the radio channel assigned to said first radio terminal are not unassigned, reassigning said first radio terminal to a predetermined number of other unassigned adjacent radio channels in said radio zone.

7. The radio channel assignment method of claim 6, wherein when said amount of communication data is below said predetermined threshold, one radio channel is assigned to said first radio terminal, and when said amount of communication data is above said predetermined threshold, a plurality of adjacent radio channels are assigned to said first radio terminal.

8. The radio channel assignment method of claim 6, further comprising the step of decreasing the number of radio channels assigned to said first radio terminal upon receipt of a request for an assignment of a radio channel in said radio zone by a second radio terminal having no assigned radio channel in said radio zone.

9. The radio channel assignment method of claim 6, wherein said radio channels in said radio zone are frequency division multiple access channels.

10. The radio channel assignment method of claim 6, wherein said radio channels in said radio zone are time division multiple access channels.

11. A radio channel assignment method for assigning radio channels for carrying out communications between a base station and a plurality of radio terminals in a radio zone of the base station, comprising the steps of:

assigning at least one radio channel to a first radio terminal in said radio zone;

determining the amount of communication data to be sent from said first radio terminal to said base station;

when the amount of communication data is determined to be above a predetermined threshold representing acceptable data transmission capacity for the number of presently assigned radio channels, requesting of said first radio terminal an increase in the number of radio channels assigned to said first radio terminal;

when the amount of communication data is determined to be below a predetermined threshold representing acceptable data transmission capacity for the number of presently assigned radio channels, requesting of said first radio terminal a decrease in the number of radio channels assigned to said first radio terminal;

in response to a request for an increase in the number of radio channels assigned to said first radio terminal, determining whether a predetermined number of radio channels in said radio zone adjacent to the radio channel assigned to said first radio terminal are unassigned, and if so assigning said predetermined number of adjacent radio channels to said first radio terminal; if a predetermined number of radio channels in said radio zone adjacent to the radio channel assigned to said first radio terminal are not unassigned, reassigning adjacent radio channels presently assigned to other radio terminals of said plurality of radio terminals to said first radio terminal, and assigning said other radio terminals to other unassigned radio channels in said radio zone.

12. The radio channel assignment method of claim 11, wherein when said amount of communication data is below said predetermined threshold, one radio channel is assigned to said first radio terminal, and when said amount of communication data is above said predetermined threshold, a plurality of adjacent radio channels are assigned to said first radio terminal.

13. The radio channel assignment method of claim 11, further comprising the step of decreasing the number of radio channels assigned to said first radio terminal upon receipt of a request for an assignment of a radio channel in said radio zone by a second radio terminal having no assigned radio channel in said radio zone.

14. The radio channel assignment method of claim 11, wherein said radio channels in said radio zone are frequency division multiple access channels.

15. The radio channel assignment method of claim 11, wherein said radio channels in said radio zone are time division multiple access channels.

16. A radio channel assignment method for assigning radio channels for carrying out communications between a base station and a plurality of radio terminals in a radio zone of the base station, comprising the steps of:

assigning at least one radio channel to a first radio terminal in said radio zone;

determining the amount of communication data to be sent from said first radio terminal to said base station;

when the amount of communication data is determined to be above a predetermined threshold representing acceptable data transmission capacity for the number of presently assigned radio channels, requesting of said first radio terminal an increase in the number of radio channels assigned to said first radio terminal;

when the amount of communication data is determined to be below a predetermined threshold representing acceptable data transmission capacity for the number of presently assigned radio channels, requesting of said first radio terminal a decrease in the number of radio channels assigned to said first radio terminal;

in response to a request for an increase in the number of radio channels assigned to said first radio terminal, determining whether a predetermined number of radio channels in said radio zone adjacent to the radio channel assigned to said first radio terminal are unassigned, and if so assigning said predetermined number of adjacent radio channels to said first radio terminal; if a predetermined number of radio channels in said radio zone adjacent to the radio channel assigned to said first radio terminal are not unassigned, reassigning said first radio terminal to a predetermined number of other unassigned adjacent radio channels in said radio zone.

17. The radio channel assignment method of claim 16, wherein when said amount of communication data is below said predetermined threshold, one radio channel is assigned to said first radio terminal, and when said amount of communication data is above said predetermined threshold, a plurality of adjacent radio channels are assigned to said first radio terminal.

18. The radio channel assignment method of claim 16, further comprising the step of decreasing the number of radio channels assigned to said first radio terminal upon receipt of a request for an assignment of a radio channel in said radio zone by a second radio terminal having no assigned radio channel in said radio zone.

19. The radio channel assignment method of claim 16, wherein said radio channels in said radio zone are time division multiple access channels.

20. The radio channel assignment method of claim 16, wherein said radio channels in said radio zone are time division multiple access channels.

\* \* \* \* \*